United States Patent Office 3,068,213
Patented Dec. 11, 1962

3,068,213
CATIONIC COPOLYMERIC QUATERNARY SALTS OF CHLOROMETHYL STYRENE AND ACRYLAMIDE
John H. Rassweiler, Greenwich, and David R. Sexsmith, Stamford, Conn., assignors to American Cyanamid Company, New York, N.Y., a corporation of Maine
No Drawing. Filed Dec. 1, 1959, Ser. No. 856,362
1 Claim. (Cl. 260—87.5)

This invention relates to water-soluble copolymers containing quaternary ammonium salt groups. More particularly, this invention is directed to novel aqueous-soluble copolymeric compositions obtained by quaternizing a copolymer of ar-substituted halo alkyl styrenes and an acrylamido monomer with certain tertiary amines.

The linear chain copolymers of the invention are thermoplastic resinous polymerization products consisting essentially of two different types of monomers. The first or hydrophobic type, which is usually employed in minor amounts, i.e. less than 50% by weight, is a monoethylenically unsaturated monomer containing a $CH_2=C<$ or vinyl group having attached thereto an aromatic hydrophobic substituent capable of imparting water repellency to hydrophilic surfaces. The hydrophobic substituents consist more specifically of an aromatic ring containing thereon, as an essential part, a halogenated alkyl radical. The monomers of the second type, the acrylamido monomers, are also monoethylenically unsaturated compounds capable of copolymerizing with those of the first type through a $CH_2=C<$ group but are, as distinguished from the first type, essentially hydrophilic. The invention is particularly concerned with the advantages afforded by the copolymerization product of these two specific types of monomers, but it will be understood that other copolymerizable compounds may also be present in minor amounts of up to about 15% of the weight of the copolymer in some cases.

A variety of organic copolymers containing one or more hydrophobic group may be used. Typical among this first type of monomers are polymerizable compounds represented by the formula

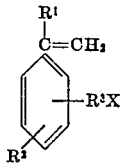

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom. Examples of this type are compounds such as ar-(chloromethyl)styrene, ar-(1-chloroethyl)styrene, ar-(bromomethyl)styrene, ar - (1 - bromoethyl)styrene, ar-chloro-ar-(chloromethyl)styrene, ar-methyl-ar-bromomethylstyrene, ar-ethyl-ar-chloromethylstyrene, ar-methyl-ar-chloromethylstyrene, ar-chloro-ar-(1-chloroethyl)styrene, α-methyl ar(1-chloroethyl)styrene, ar-bromo-ar (chloromethyl)styrene, α - methyl-ar(chloromethyl)styrene, and the like. As noted above, a haloalkyl radical is an essential part of the ar-substituted styrenes.

Examples of the acrylamido, or second type compounds which are employed in the preparation of copolymers with which the invention is specifically concerned are compounds of the general formula

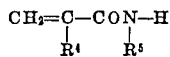

wherein $R^4$ is a substituent selected from the group consisting of hydrogen, halogen and methyl radicals and $R^5$ is a substituent selected from the group consisting of hydrogen and alkyl radicals of 1–20 carbon atoms. Suitable compounds of this type are such as acrylamide, methacrylamide, α-chloroacrylamide, α-bromoacrylamide and the N-substituted alkyl derivatives such as N-methylacrylamide, N-ethylacrylamide, N-propylacrylamide, N-t-butylacrylamide, N-dodecylacrylamide, and the like.

The relative mole ratios of the copolymerizable components may vary from about 1 to 95 mole percent of the vinyl aromatic monomers and from about 99 to about 5 mole percent of the acrylamido monomers and preferably a mole ratio of vinyl aromatic to acrylamido monomer in the range of 1:99 to about 40:60, respectively.

It is understood that within the scope of the invention mixtures or blends of the monomers of the first type may be copolymerized with mixtures or blends of monomers of the second type.

As noted hereinabove it may be desirable to modify these copolymers by the addition of up to about 15% of a third and different polymerizable monomer during the copolymerization reaction. Suitable compounds are the polymerizable monomers containing a $CH_2=C<$ group. Exemplary monomers which may be employed are vinyl chloride and vinylidene chloride; the vinyl esters, such as vinyl acetate, ethyl acrylate, ethyl methacrylate, methyl methacrylate, etc. and conjugated diolefins such as butadiene, isoprene, chloroprene, 2,3-dimethyl butadiene, and the like.

The optimum proportions of the comonomers in the copolymerizable compound depend on the particular application. It will be apparent that the copolymer, prior to conversion of the haloalkyl group on the aromatic ring, may be soluble where it contains a high proportion, i.e., about 60% or more, of the water-soluble acrylamido compound. Here the effect of this high proportion offsets the hydrophobic character of the vinyl aromatic component resulting in water solubility. Where the copolymer is insoluble in water, the formation of the quaternary ammonium salt effects the desired water solubility. An essential characteristic in addition to water solubility is derived upon reaction of the copolymer with the quaternizing amine. By this reaction, the non-ionic nature of the copolymer is converted to a product which is cationic and substantive to cellulose, i.e. the resin is selectively adsorbed or absorbed by the cellulose fibers from a dilute aqueous solution or dispersion thereof containing these fibers in amounts much greater than those corresponding to the concentration of resin in the solution or to what would be contained in the water normally left in the sheet after forming. This property permits the application of the resin to cellulosic fibers at the beater stage to impart dry strength to paper. Generally the resinous salt is used in dilute aqueous solutions so as to provide a resin concentration of about 1% based on dry pulp.

The copolymerization of the vinyl aromatic compound containing the alkyl halogen radical and the arcylamido compound can be effected by any of the procedures known to be suitable for polymerizing vinyl compounds. Thus thermal or ultraviolet light polymerization may be employed. Preferably, a small quantity, on the order of 0.1% to 2% on the weight of the monomers, of a suitable polymerization initiator, such as azobisisobutyronitrile, benzoyl peroxide, cumene hydroperoxide, pinane hydroperoxide, and the like, is added, after which the reaction mixture is heated at temperatures of about 50° C. to 150° C. until the copolymerization has been carried to the desired extent. Bulk polymerization procedures may be used in which the reagents are simply heated together in a closed vessel, or the polymerization can be carried out in an organic solvent, such as dioxane, toluene, or other aromatic hydrocarbon solvent, and the like.

The presence of water-soluble material in the aqueous solution of the salts of the copolymers is not excluded. For example cooked starch may be employed to further enhance the properties which are imparted by the resin without losing any advantages afforded by the copolymers of the invention.

Illustrative examples of suitable tertiary amines which may be employed are such as the alkyl amines of the formula

wherein $R^6$, $R^7$ and $R^8$ are substituents selected from the group consisting of allyl radicals and alkyl radicals of 1 to 4 carbon atoms, e.g., trimethylamine, triethylamine, tripropylamine, dimethylethylamine, diethylmethylamine, methyldipropylamine, dipropylethylamine, and the like. Pyridine and alkyl and halogen substituted pyridines such as picoline, butadiene, colidine, N-methyl piperidine and ring substituted N-methyl piperidines are also included. In general, alkyl pyridines and alkyl substituted N-methyl piperidines having alkyl groups of 1 to 4 carbon atoms are contemplated.

The quaternary product prepared by reacting a copolymer of an acrylamide and a vinyl aromatic monomer containing an alkyl halide radical on the ring with an amine according to the invention may be described by the formula

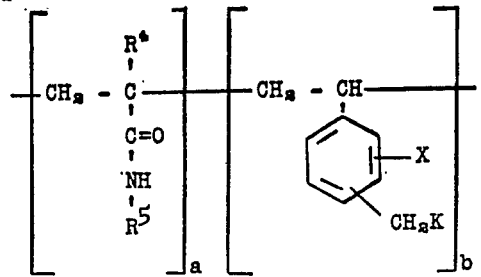

wherein $R^4$ is a substituent selected from the group consisting of hydrogen, halogen and methyl radicals, $R^5$ is a substituent selected from the group consisting of hydrogen and alkyl radicals of 1 to 20 carbon atoms and K is a quaternary ammonium salt radical elected from the group consisting of (I) 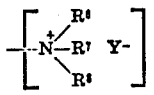

(II) 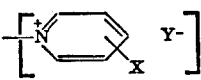

and (III) 

wherein $R^6$, $R^7$ and $R^8$ are substituents selected from the group consisting of allyl radicals and alkyl radicals of from 1 to 4 carbon atoms, X is a substituent selected from the group consisting of hydrogen, halogen, methyl and ethyl radicals, and Y is a halogen atom selected from the group consisting of chlorine, bromine and iodine, and the mole ratio of $a$ to $b$ is from about 99:1 to about 5:95, respectively.

From a practical standpoint, it is sometimes desirable to dissolve the polymer salt in a mixture of a water and water-miscible solvent before adding additional water to dilute the mixture further. The addition of small amounts, i.e. generally of water-miscible organic solvent does not interfere with the use of these copolymers and frequently improves solubility in water. Frequently by adding these small amounts of solvents, the copolymers of the invention are rendered more soluble and useful than would be the case if the water-miscible organic solvent were omitted. Water-miscible organic solvents for this purpose are such as dioxane, dimethyl formamide, butyl cellusolve, ethyl cellusolve, or various water-miscible alcohols and ketones.

The molecular weights of the copolymers are not critically important, inasmuch as the water-soluble products are obtainable over a wide range of molecular weights. The more useful properties are obtained when the copolymers have attained molecular weights of at least about 10,000 although it will be understood that the resins produced by the above-described processes ordinarily have molecular weights substantially higher than this minimum and usually within the range of about 50,000 to 800,000 and even higher.

It will be seen, therefore, that the linear carbon chain polymers used in practicing the invention are cationic quaternary salts of (a) polymerizable ar-substituted vinyl aromatic, which substituents are halogenated alkyl radicals of 1 to 2 carbon atoms, and (b) acrylamido monomers copolymerizable with (a). All or part of the halogens in the vinyl aromatic alkyl group in the straight chain copolymer are converted to salt groups by reacting the copolymers with (c) tertiary amines.

Because of their water solubility, these resins can be economically applied to surfaces. They have been found to confer unusual dry strength properties to paper substrates to which they have been applied. In addition to their use with cellulosic bodies, the resins may be applied to various substrates, e.g., to textiles and to glass and metal surfaces, to improve the surface characteristics of these materials.

In order that the present invention may be more fully understood, the following examples are set forth for purposes of illustration only, and any specific enumeration of details should not be interpreted as a limitation, except as expressed in the appended claims.

In the examples which follow, the parts expressed are parts by weight, unless otherwise stated.

*Example 1*

32 parts of acrylamide and 7.6 parts of chloromethylstyrene were brought to reflux in 200 parts of acetone and treated with 1.45 parts of benzoyl peroxide. After refluxing for 3 hours the precipitated polymer was collected by filtration and air dried. 34.5 parts or 87.1% yield is obtained. 10 parts of the product is dissolved in 50 parts of water and treated with 1.45 parts of triethylamine. A slight exotherm was observed. After 45 minutes the temperature was raised to 50° C. for 1 hour, after which time a sample of the solution gave a positive chloride ion test with silver nitrate. The polymer was cooled and stood overnight at room temperature. It is stable against cross-linking and is still water-soluble after 3 months as compared with the copolymer lacking the quaternary groups which insolubilized in less than 12 hours. When applied to paper for use as a dry strength additive, the quaternary ammonium polymer is preferably employed in concentration to provide about 1% polymer solids by weight based on the dry weight of the pulp.

*Example 2*

38.7 parts of methacrylamide and 7.6 parts of chloromethylstyrene are copolymerized as in Example 1. The copolymeric product is then quaternized with tri-ethylamine, 1.52 parts. The product is still soluble after three months. It is an effective dry strength resin for paper.

*Example 3*

32 parts of acrylamide and 7.6 parts of chloromethylstyrene are copolymerized as in Example 1. Quaternization of the copolymeric product is conducted with 1.19 parts of pyridine.

*Example 4*

28.4 parts of acrylamide and 15.2 parts of chloromethylstyrene are copolymerized as in Example 1. The product is then quaternized with 2.9 parts of triallylamine.

*Example 5*

28.4 parts of acrylamide and 15.2 parts of chloromethylstyrene are copolymerized as in Example 1 and then the polymeric product is quaternized with 1.26 parts of triethylamine.

We claim:

A process of producing a water-soluble, linear chain, cationic resinous composition which comprises (1) polymerizing 32 parts of acrylamide with 7.6 parts of chloromethylstyrene to form thereby a thermoplastic, resinous, linear chain copolymer and (2) quaternizing said copolymer with 14.5% by weight, based on the weight of said copolymer, of triethyl amine.

References Cited in the file of this patent

UNITED STATES PATENTS

| | | |
|---|---|---|
| 2,593,399 | Park | Apr. 22, 1952 |
| 2,620,330 | Park | Dec. 2, 1952 |
| 2,780,604 | Clarke et al. | Feb. 5, 1957 |

OTHER REFERENCES

Jones et al.: Journal of Polymer Sci., pages 201–15 (pages 206–211 and 214 relied on), 25 (1957).